(12) United States Patent
Kuribayashi

(10) Patent No.: US 10,857,576 B2
(45) Date of Patent: *Dec. 8, 2020

(54) SNOW ADHESION PREVENTING DEVICE AND SIGNALING APPARATUS

(71) Applicant: TOSHIBA TEC KABUSHIKI KAISHA, Tokyo (JP)

(72) Inventor: Yasushi Kuribayashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,635

(22) Filed: Feb. 20, 2020

(65) Prior Publication Data

US 2020/0188970 A1 Jun. 18, 2020

Related U.S. Application Data

(60) Continuation of application No. 16/150,343, filed on Oct. 3, 2018, now Pat. No. 10,589,323, which is a (Continued)

(30) Foreign Application Priority Data

May 12, 2016 (JP) .................................. 2016-096022

(51) Int. Cl.
*B08B 7/02* (2006.01)
*G02B 27/00* (2006.01)
(Continued)

(52) U.S. Cl.
CPC ............ *B08B 7/02* (2013.01); *G02B 27/0006* (2013.01); *B60R 1/0602* (2013.01);
(Continued)

(58) Field of Classification Search
CPC ....................................................... B08B 7/02
See application file for complete search history.

(56) References Cited

U.S. PATENT DOCUMENTS

| 3,171,683 A | 3/1965 | Ludwig |
| 4,768,256 A | 9/1988 | Motoda |

(Continued)

FOREIGN PATENT DOCUMENTS

| JP | 08-134855 | 5/1996 |
| JP | 2000-207683 | 7/2000 |

(Continued)

OTHER PUBLICATIONS

Japanese Office Action for Japanese Patent Application No. 2016-096022 dated Mar. 17, 2020.

(Continued)

*Primary Examiner* — Alexander K Garlen
(74) *Attorney, Agent, or Firm* — Amin, Turocy & Watson, LLP

(57) ABSTRACT

There is provided a signaling apparatus including a plurality of LED elements provided in a signal lamp body; a transparent panel provided in the LED elements and configured to transmit outgoing light from the LED elements on a rear side to a front surface to which snow adheres; a frame unit provided on an outer periphery of the panel; and vibration generators provided in the frame unit and configured to vibrate the panel.

20 Claims, 10 Drawing Sheets

Related U.S. Application Data division of application No. 15/592,459, filed on May 11, 2017, now Pat. No. 10,118,206.

(51) Int. Cl.
*F21Y 115/10* (2016.01)
*B60R 1/06* (2006.01)
*F21W 111/02* (2006.01)
*G08G 1/048* (2006.01)

(52) U.S. Cl.
CPC ....... *F21W 2111/02* (2013.01); *F21Y 2115/10* (2016.08); *G08G 1/048* (2013.01)

(56) References Cited

U.S. PATENT DOCUMENTS

| | | | |
|---|---|---|---|
| 4,929,072 A | | 5/1990 | Fujie et al. |
| 5,172,024 A | | 12/1992 | Broussoux et al. |
| 7,084,553 B2 | * | 8/2006 | Ludwiczak ............... B08B 7/02 310/321 |
| 7,770,453 B2 | * | 8/2010 | Ludwiczak ............... B06B 3/00 73/579 |
| 8,087,297 B2 | * | 1/2012 | Ludwiczak ............... B06B 3/00 310/321 |
| 2007/0114225 A1 | | 5/2007 | Smith et al. |
| 2010/0149785 A1 | | 6/2010 | Dubuc et al. |
| 2011/0073142 A1 | | 3/2011 | Hattori et al. |
| 2012/0057066 A1 | | 3/2012 | Kawai |
| 2012/0243093 A1 | | 9/2012 | Tonar et al. |
| 2014/0166044 A1 | | 6/2014 | Klier et al. |
| 2014/0184075 A1 | | 7/2014 | Ter-Hovhannissian |
| 2015/0029340 A1 | | 1/2015 | Taguchi et al. |
| 2015/0138357 A1 | | 5/2015 | Romack et al. |
| 2015/0370014 A1 | | 12/2015 | Poh et al. |
| 2016/0170203 A1 | | 6/2016 | Weigert et al. |
| 2016/0266379 A1 | | 9/2016 | Li et al. |
| 2018/0328550 A1 | | 11/2018 | Mizobe |

FOREIGN PATENT DOCUMENTS

| | | |
|---|---|---|
| JP | 2007-141761 | 6/2007 |
| JP | 2013-105800 | 5/2013 |
| JP | 2015-069275 | 4/2015 |

OTHER PUBLICATIONS

Non-Final Office Action for U.S. Appl. No. 16/150,343 dated Jul. 12, 2019.

* cited by examiner

FIG. 1(a)
FIG. 1(b)
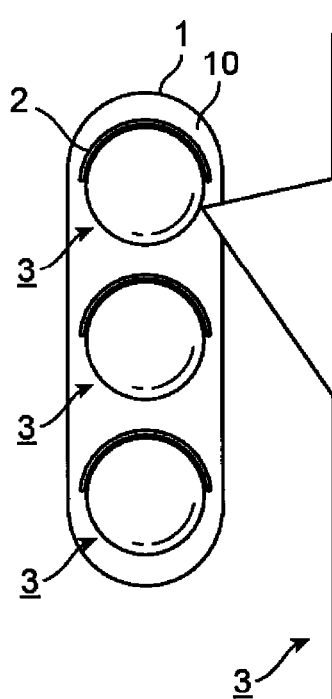
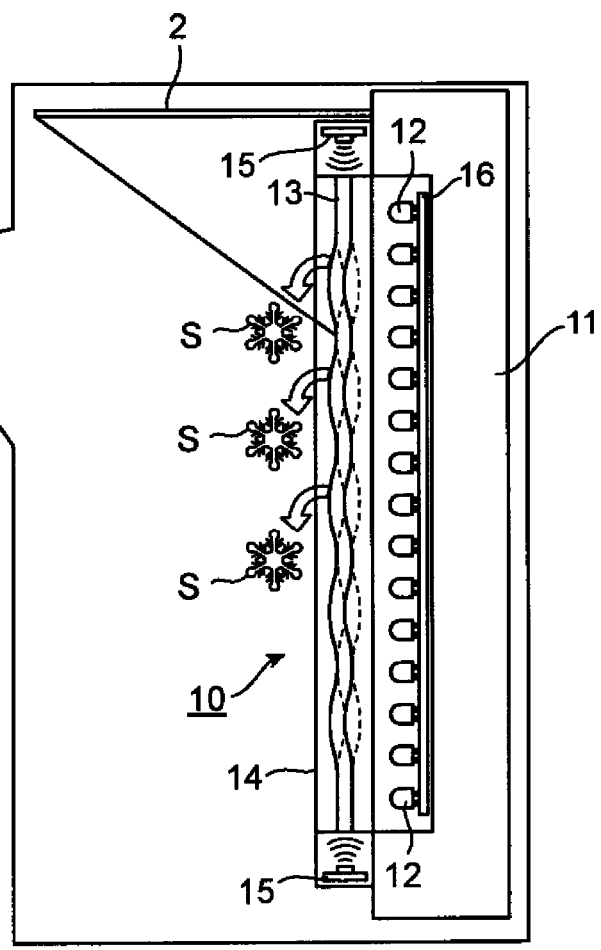

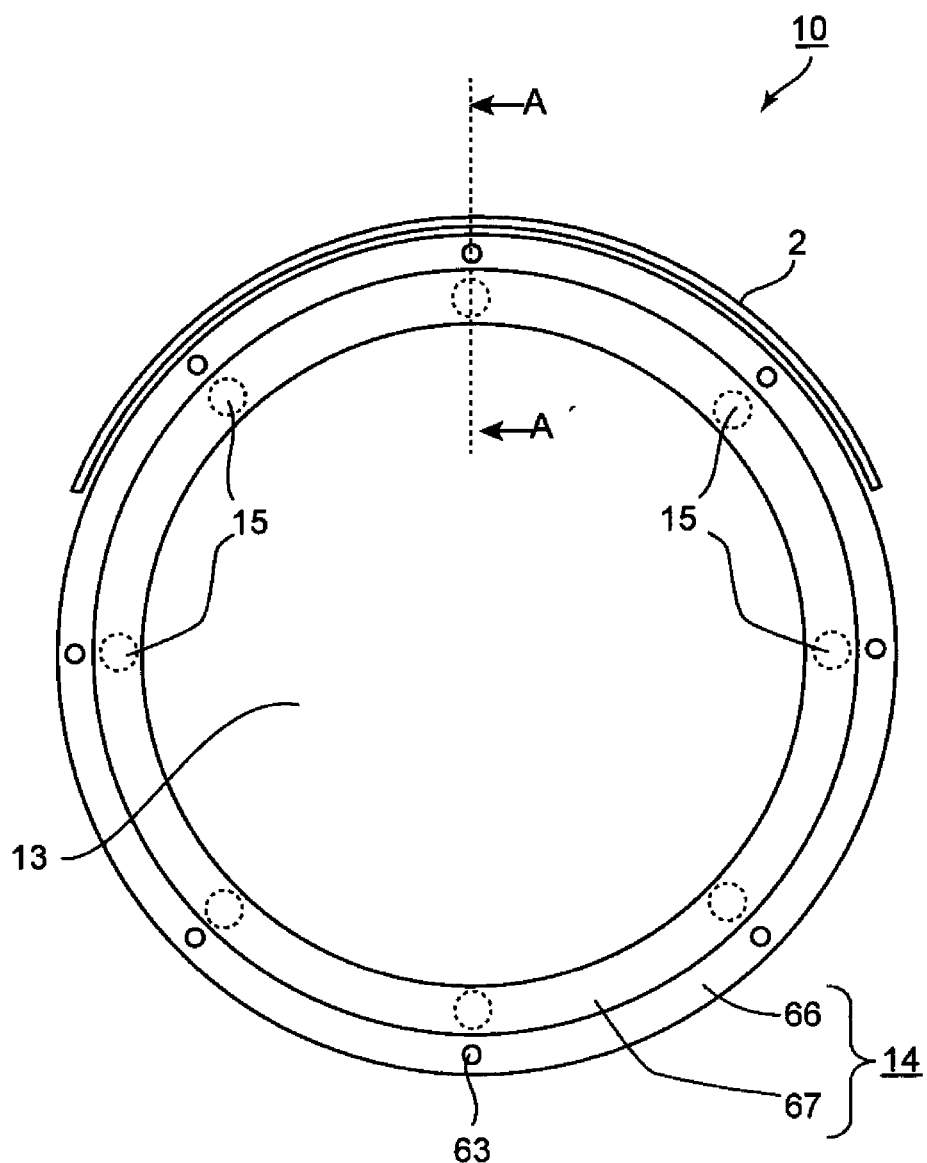

SNOW ADHESION PREVENTING DEVICE AND SIGNALING APPARATUS

CROSS-REFERENCE TO RELATED APPLICATIONS

This application is a Continuation of application Ser. No. 16/150,343 filed on Oct. 3, 2018, which is a Divisional of application Ser. No. 15/592,459 filed on May 11, 2017, the entire contents of both of which are incorporated herein by reference.

This application is based upon and claims the benefit of priority from Japanese Patent Application No. P2016-096022, filed May 12, 2016, the entire contents of which are incorporated herein by reference.

FIELD

Embodiments described herein relate generally to a snow adhesion preventing device and a signaling apparatus.

BACKGROUND

A person needs to sweep snow from a signal lamp with a brush so that signal colors are not prevented from being viewed due to snow piled up in a signaling apparatus in snowy areas. In the related art, a snow removing device for a signaling apparatus, which removes snow on an eave of a signal lamp, is known (for example, see JP-A-2000-207683). In recent years, as a light source of a signal lamp, a light emitting bulb has been replaced with an LED (light emitting diode) and a traffic signal mechanism for preventing snow from adhering to a signaling apparatus, in which the LED is used as a light source of the signaling apparatus, has been proposed (for example, see JP-A-2015-069275).

DESCRIPTION OF THE DRAWINGS

FIG. 1(a) is a front view of a signaling apparatus including a snow adhesion preventing device according to a first embodiment and FIG. 1(b) is a view illustrating a longitudinal sectional structure of the snow adhesion preventing device according to the first embodiment.

FIG. 2 is a front view of the snow adhesion preventing device according to the first embodiment.

DETAILED DESCRIPTION

Figure 3:
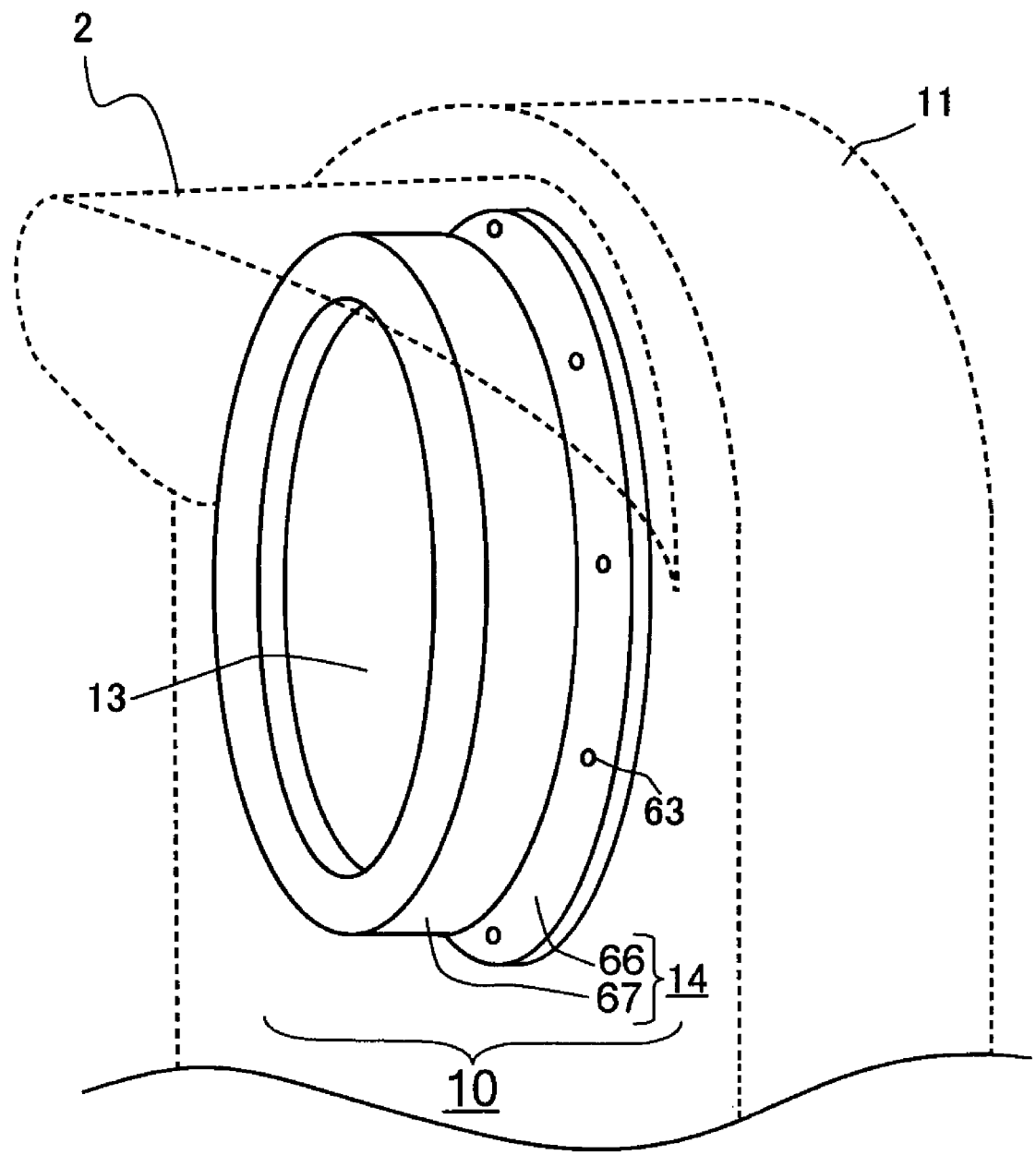
FIG. 3 is a perspective view of the snow adhesion preventing device according to the first embodiment.

In the signaling apparatus using the LED elements as the light sources for a display lamp, visibility of lighting colors is impaired. Since an amount of heat generated by a LED lamp itself is smaller than an amount of heat generated by a lamp using an incandescent bulb, even if snow from a lateral direction such as snowstorm adheres to a panel of the lamp, the snow does not dissolve. The frozen snow markedly impairs the visibility of the lighting color of the lamp.

In order to solve the problem described above, according to an embodiment, there is provided a snow adhesion preventing device including a transparent panel configured to transmit outgoing light from LED elements on a rear side to a front surface to which snow adheres; a frame unit provided on an outer periphery of the panel; and vibration generators provided in the frame unit and configured to vibrate the panel.

According to another embodiment, there is provided a signaling apparatus including a plurality of LED elements provided in a signal lamp body; a transparent panel provided on a front side of the LED elements and configured to transmit outgoing light from the LED elements on a rear side to a front surface to which snow adheres; a frame unit provided on an outer periphery of the panel; and vibration generators provided in the frame unit and configured to vibrate the panel.

Hereinafter, a snow adhesion preventing device and a signaling apparatus according to embodiments will be described with reference to FIGS. 1 to 12. In each drawing, the same reference numerals are given to the same portions and redundant description will be omitted.

First Embodiment

FIG. 1(a) is a front view of the signaling apparatus including the snow adhesion preventing device according to a first embodiment. FIG. 1(b) is a view illustrating a longitudinal sectional structure of the snow adhesion preventing device according to the first embodiment and illustrates a longitudinal sectional surface of a lamp 3 of FIG. 1(a) viewed from a side. In the drawings, the same reference numerals indicate the same elements as each other.

A signaling apparatus 1 is a signaling apparatus of a vertical three-lamp type at an intersection and three lamps 3 respectively indicating signal colors are disposed in a vertical direction. The signaling apparatus 1 includes a housing 11 on a signal lamp body side, a plurality of LED elements 12 provided in the housing 11, a lamp panel 13 (panel) provided on a front side of the LED elements 12 and configured to transmit outgoing light from the LED elements 12 on a rear side to a front surface to which snow adheres, a frame unit 14 provided on an outer periphery of the lamp panel 13, and a plurality of vibration generators 15 provided in the frame unit 14 and configured to respectively vibrate the lamp panel 13.

The snow adhesion preventing device 10 is integrally provided with the signaling apparatus 1 and includes the lamp panel 13 configured to transmit the outgoing light from the LED elements 12 on the rear side to the front surface of the panel, the frame unit 14 provided on the outer periphery of the lamp panel 13, and the plurality of vibration generators 15 provided in the frame unit 14.

The housing 11 has a space on a front side, that is, on a left side in the drawing and is a light box in which a circuit board 16 is provided in the space. The LED element 12 is a light source of a display lamp of which lighting is controlled by the circuit board 16. The plurality of LED elements 12 is provided in a disk region on the circuit board 16 and displays a round lamp light emission shape by turning on the light when viewed from the front side in a horizontal direction. An eave (hood) 2 is attached to each lamp 3 on the front side of the housing 11. The housing 11 is installed so as to protrude above a road by an arm extending horizontally from a signal post at the side of the road, and the three lamps 3 are integrated into the light box.

Figure 4:
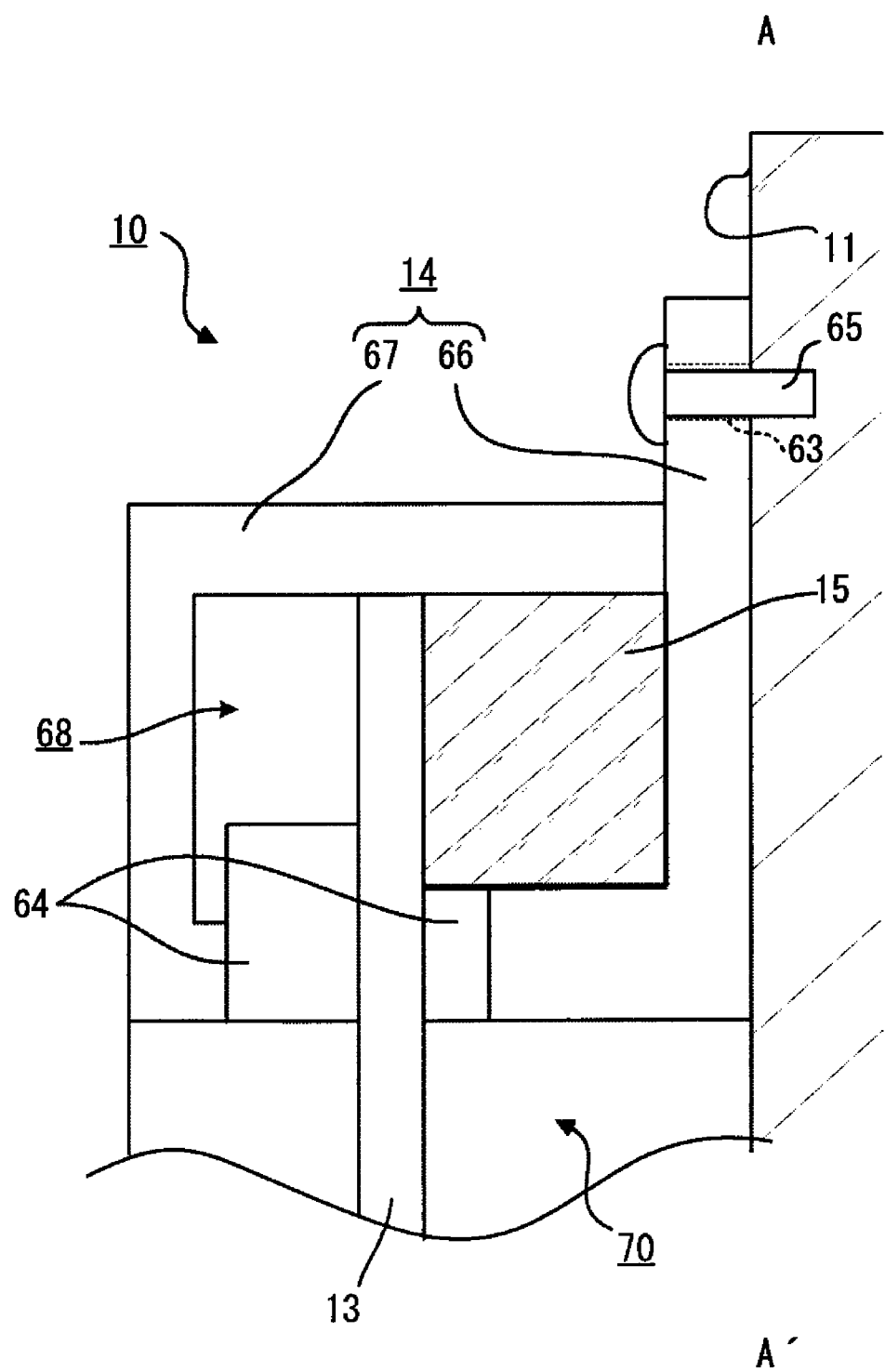
FIG. 4 is a sectional view of the snow adhesion preventing device according to the first embodiment.

FIG. 2 is a front view of the snow adhesion preventing device 10. FIG. 3 is a perspective view of the snow adhesion preventing device 10. FIG. 4 is a vertical sectional view of the snow adhesion preventing device 10. The drawing illustrates a partially longitudinal sectional structure along A-A' of FIG. 2 and the eave 2 is omitted. The reference numerals described above indicate the same elements. The lamp panel 13 is a circular flat shape made of a synthetic resin. The lamp panel 13 is made of a vibratable material without blocking light from the LED elements 12 and, for example, is made of a resin material such as acrylic or polycarbonate.

As illustrated in FIGS. 2 to 4, the frame unit 14 is a cylindrical ring-shaped frame for fixing the lamp panel 13 to the housing 11 by a peripheral portion thereof. The frame unit 14 has a flange-like first frame 66 which is fastened to the housing 11 by a screw fastener 65 to a screw hole 63, and a cylindrical second frame 67 which is larger in diameter than lamp panel 13. The plurality of vibration generators 15 are fixed equiangularly (FIG. 2) in a circumferential direction to the first frame 66. A rear surface of the lamp panel 13 is fixed to the vibration generators 15 with adhesive or the like, and vibration is applied to the lamp panel 13 by the vibration of the vibration generators 15. For example, aluminum die-casting can be used for the frame unit 14. For example, a piezoelectric element, a small motor, an eccentric cam, and the like are used for the vibration generator 15.

As illustrated in FIG. 4, the snow adhesion preventing device 10 is provided with packings 64 on the panel front surface and the panel rear surface of the lamp panel 13 for each vibration generator 5, and the packings 64 divide a space 68 and hermetically seal the vibration generator 15. The second frame 67 is fixed to the first frame 66 (or the housing 11) by screws (not illustrated) so as to cover a peripheral portion of the lamp panel 13 and the vibration generators 15 to form the snow adhesion preventing device 10. That is, the snow adhesion preventing device 10 is configured such that the frame unit 14 supports an entire periphery of the peripheral portion of the lamp panel 13 while keeping sealing property, closes the LED elements 12 from outside, and prevents snow, water, and dusts from entering an LED element 12 side from outside air through a space 70.

Next, operations of the snow adhesion preventing device 10 and the signaling apparatus 1 (FIG. 1) having the configuration described above will be described. Normally, the signaling apparatus 1 is traffic-lighted by turning on, turning off, and blinking light of the three lamps (not illustrated). Each signal color can be confirmed satisfactorily. When snow falls, windless, or wind is weak, even if snow falls on the lamp panel 13, snow does not adhere to the panel surface.

On the other hand, when wind and snow become severe and snow from the horizontal direction is blown on the lamp panel 13, snow adheres to the panel surface. The snow adhesion preventing device 10 is provided in the signaling apparatus 1 so as to protect the LED elements 12 from the outside, the snow adhesion preventing device 10 vibrates the vibration generators 15, and thereby the frame unit 14 vibrates. The lamp panel 13, which is fixed to the frame unit 14 in a state of being capable of vibrating, vibrates. The lamp panel 13 vibrates and thereby snow S that is a snow adhering prevention target is shaken off.

As described above, the snow adhesion preventing device 10 can prevent snow S from adhering to the lamp panel 13 covering the lamps 3 of the signaling apparatus 1. The snow adhesion preventing device 10 vibrates the lamp panel 13 with the vibration generators 15 provided in the frame unit 14 of the lamp panel 13, and thereby snow is prevented from adhering to the panel.

The LED element 12 has an amount of generated heat smaller than an amount of generated heat of the incandescent bulb of several tens of watts. According to the snow adhesion preventing device 10, even if the LED element 12 is used as a light source of the signal lamp, snow from the lateral direction such as snowstorm does not adhere to the lamp panel 13. Since snow does not adhere to the panel surface, visibility of the light color of the lamp 3 is not impaired by the snow frozen in the lamp panel 13. Removing work of snow accumulated on the signaling apparatus 1 by a person is reduced. Otherwise, work burden is reduced.

Second Embodiment

When a snow adhesion preventing device 10 is operated at all times, since unnecessary electric power is consumed, it is necessary to activate the snow adhesion preventing device 10 as necessary. The snow adhesion preventing device according to the second embodiment has a unit configured to detect snow adhesion.

Figure 5:
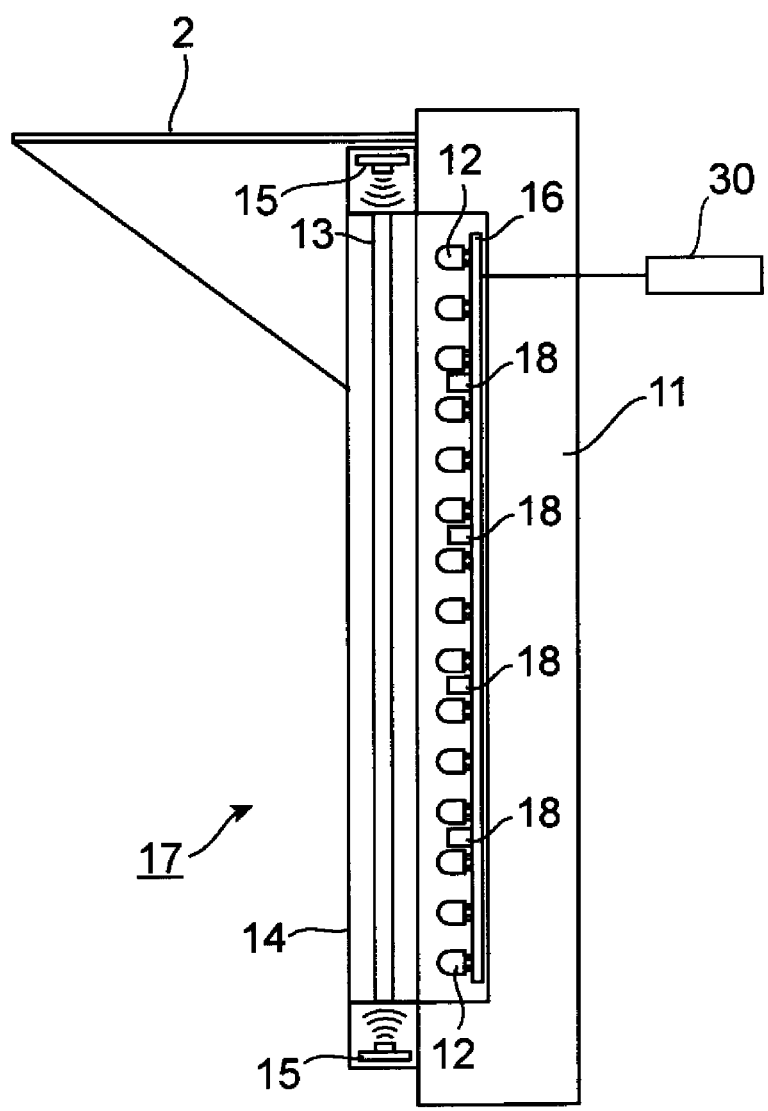
FIG. 5 is a view illustrating a longitudinal sectional structure of a snow adhesion preventing device according to a second embodiment.

FIG. 5 is a view illustrating a longitudinal sectional structure of the snow adhesion preventing device according to the second embodiment. In FIG. 5, the reference numerals described above indicate the same elements as those in FIGS. 1 to 4.

A snow adhesion preventing device 17 (snow adhesion preventing device according to the second embodiment) further includes a plurality of snow adhesion detection sensors 18 (sensors) which respectively detect snow adhered to a lamp panel 13. Vibration generators 15 remove snow adhesion by snow adhesion detection of the snow adhesion detection sensors 18. The plurality of snow adhesion detection sensors 18 are mounted on a circuit board 16 between the LED elements 12 within a disk region on the circuit board 16 on which the LED elements 12 are provided. The mounting between the LED elements 12 means, for example, that the snow adhesion detection sensors 18 are disposed at equal intervals in a vertical direction transmitting a center axis within the disk region. Otherwise, the mounting between the LED elements 12 means that the plurality of snow adhesion detection sensors 18 are distributed and mounted with appropriate density in the disk region. A reflective type sensor is used for the snow adhesion detection sensor 18.

Figure 6:
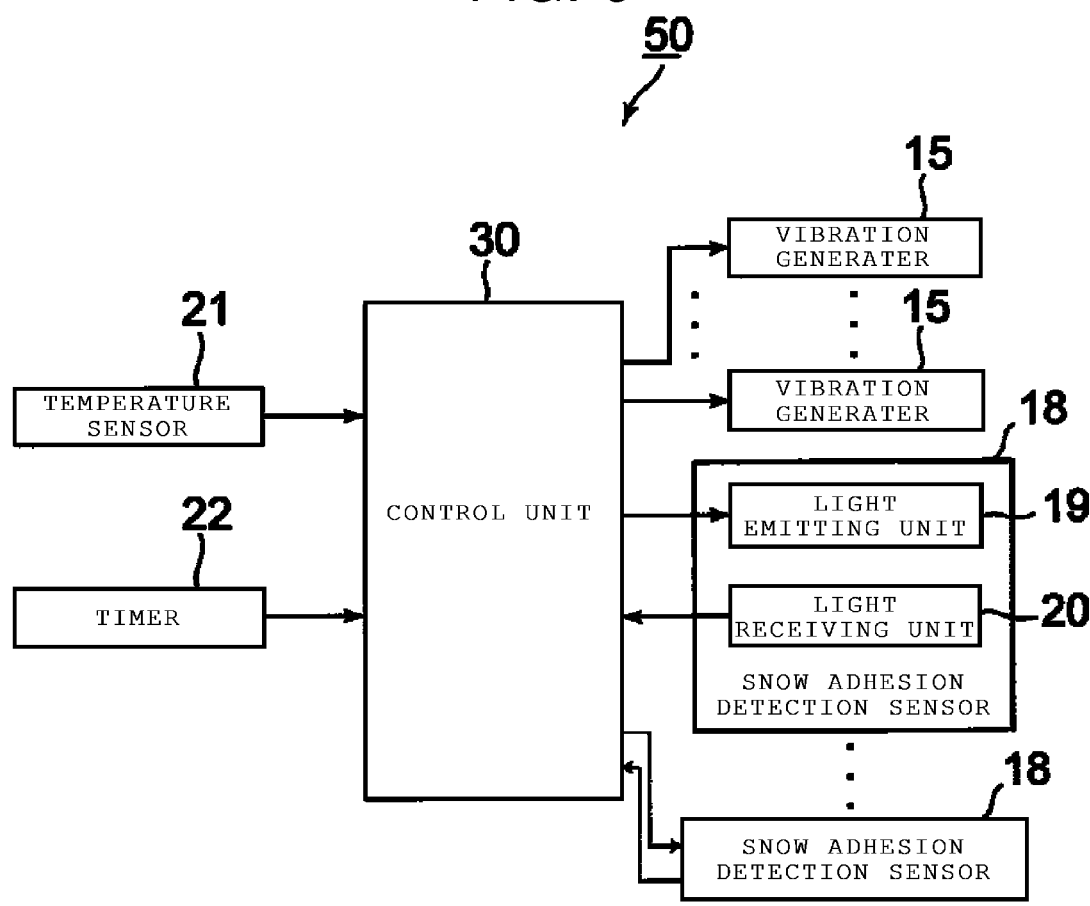
FIG. 6 is a block diagram of a control system based on snow adhesion detection of the snow adhesion preventing device according to the second embodiment.

FIG. 6 is a block diagram of a control system based on snow adhesion detection of the snow adhesion preventing device according to the second embodiment. The reference numerals described above indicate the same elements as those in FIGS. 1 to 4. A control system 50 includes a plurality of vibration generators 15, a plurality of snow adhesion detection sensors 18, a temperature sensor 21, a timer 22, a control unit 30 that is electrically connected to the vibration generators 15, the snow adhesion detection sensors 18, and the like.

The snow adhesion detection sensor 18 has a light emitting unit (another light source) 19 that is provided on a rear side of a lamp panel 13, and a light receiving unit 20 that receives light reflected and returned by snow adhesion on the panel front surface of the lamp panel 13 from the light emitting unit 19, and is provided on the rear side of the lamp panel 13. The light emitting unit 19 is mainly configured of the LED elements and the direction of the LED elements is adjusted in advance so that an optical axis of the outgoing light faces the lamp panel 13. The light receiving unit 20 is a photodiode (PD). With respect to the orientation of the photodiode, a light receiving axis is adjusted in advance so that light reflected on the panel front surface of the lamp panel 13 and light reflected on the panel rear surface can be respectively received. All the other the snow adhesion detection sensors 18 in FIG. 5 have the same configuration as that of FIG. 6.

In other words, the snow adhesion detection sensor 18 is a reflection type sensor configured of a light emitting light source unit (light emitting unit 19) different from the light source of the display lamp provided on the inside of the lamp panel 13, and the light receiving unit 20 that is provided on the inside of the lamp panel 13 that receives the reflection light that is reflected and returned on snow adhesion of the outside of the lamp panel 13 from the light emitting the light transmittance source.

The temperature sensor 21 is provided in the housing 11 or the frame unit 14, and measures an outside temperature, an environmental temperature on the circuit board 16 or within the frame unit 14. The timer 22 generates a notification signal to activate the vibration generators 15 every set time. The control unit 30 holds set values such as a temperature threshold value, vibration conditions, vibration time length, vibration interval, and a size of vibration amount, and transmits and receives a control signal to and from each snow adhesion detection sensor 18. A function of the control unit 30 is executed by software using a CPU, a ROM, and a RAM. The control unit 30 is mounted on the circuit board 16, the housing 11, the signaling apparatus 1, or a traffic signal controller.

Except for these points, the snow adhesion preventing device 17 and the signaling apparatus according to the embodiment have substantially the same configurations as the configurations of the snow adhesion preventing device 10 and the signaling apparatus 1 described above unless otherwise specified.

Next, an operation of the snow adhesion preventing device (FIGS. 5 and 6) according to the second embodiment will be described.

The timer 22 sends the notification signal to the control unit 30 at preset time intervals. The control unit 30 activates the vibration generators 15 with the notification signal. When the control unit 30 operates the vibration generators 15 for a set time length, it causes the vibration generators 15 to rest. The control unit 30 monitors an outside air temperature measured by the temperature sensor 21, and the like, and operates the vibration generators 15 when the temperature is a threshold temperature or less.

The control unit 30 does not operate the vibration generators 15 of the snow adhesion preventing device 17 according to a normal time or the season of fine weather depending on outputs from the timer 22 and the temperature sensor 21, or a signal indicating a weather change from the traffic signal controller. When snow falls, the control unit 30 operates the plurality of snow adhesion detection sensors 18. When the control unit 30 supplies a drive current to the snowadhesion detection sensors 18, light is emitted from all the light emitting units 19.

Figure 7:
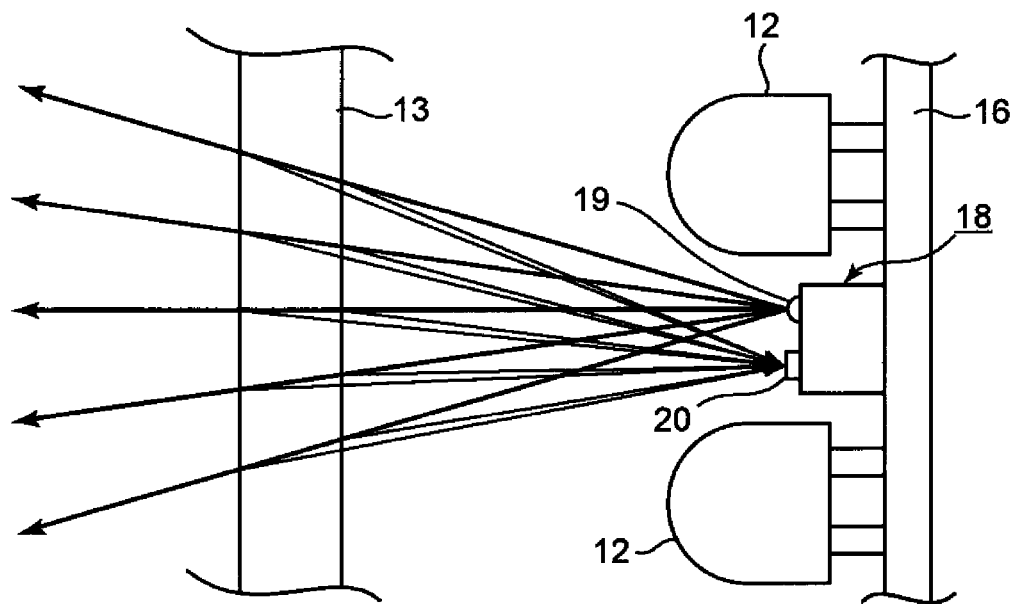
FIG. 7 is a view illustrating an example of an optical axis of transmitted and received light when there is no snow adhesion by a sensor of the snow adhesion preventing device according to the second embodiment.

FIG. 7 is a view illustrating an example of an optical axis of transmitted and received light when there is no snow adhesion by the snow adhesion detection sensor 18 of the snow adhesion preventing device according to the second embodiment and illustrates apart of FIG. 5 in an enlarged manner. The reference numerals described above indicate the same elements as those in FIGS. 1 to 6.

As illustrated in FIG. 7, when no foreign object such as snow is attached to the lamp panel 13, light that is reflected and returned to the light receiving unit 20 is only light reflected by the panel front surface and the panel rear surface of the lamp panel 13 and weak. Light of most light amount in the light emitted from the light emitting unit 19 of the snow adhesion detection sensor 18 transmitting the lamp panel 13. Light emitted from each light emitting unit 19 is reflected by a boundary surface between the panel front surface of the lamp panel 13 and the outside air, and a boundary surface between the panel rear surface and the outside air, respectively. Light obtained by combining the reflected lights by a plurality of light emitting units 19 is incident on one light receiving unit 20. The control unit 30 determines that the received light intensity is weak by a light receiving current from a plurality of light receiving units 20.

Figure 8:
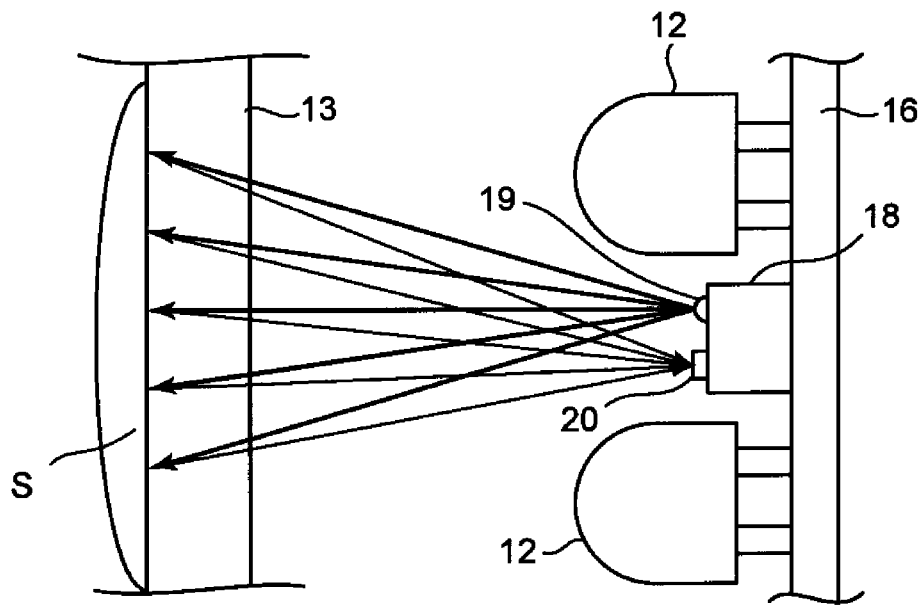
FIG. 8 is a view illustrating an example of an optical axis of transmitted and received light when there is snow adhesion by the sensor of the snow adhesion preventing device according to the second embodiment.

FIG. 8 is a view illustrating an example of an optical axis of transmitted and received light when there is snow adhesion S by the snow adhesion detection sensor 18 of the snow adhesion preventing device according to the second embodiment. The reference numerals described above indicate the same elements as those in FIGS. 1 to 7. As illustrated in the drawing, when a foreign object such as snow is attached to the lamp panel 13, light reflected by snow or the like is returned to the light receiving unit 20. The control unit 30 stores the received light intensity at a first time point (when there is no snow adhesion) as a normal threshold value. The control unit 30 compares the received light intensity of the reflected light detected at a second time point (when there is snow adhesion) with the threshold value. If the received light intensity at the first time point is smaller than received light intensity at the second time point, the control unit 30 determines whether there is no snow adhesion or that the adhesion amount is minute even if snow adheres. If the received light intensity at the first time point is larger than received light intensity at the second time point, the control unit 30 determines that the light reflected on the panel front surface and the panel rear surface of the lamp panel 13 appears more strongly than reflected light at the first time point. The control unit 30 can detect that snow or the foreign object adheres to the lamp panel 13. The control unit 30 vibrates the plurality of vibration generators 15 and the lamp panel 13 vibrates. When the lamp panel 13 vibrates, snow S of the snow adhering prevention target is dropped.

According to the snow adhesion preventing device of the embodiment, the lamp panel 13 is vibrated by snow adhesion detection without operating the vibration generators 15. Therefore, it is not necessary to consume unnecessary power.

It is possible to increase an S/N ratio of the snow adhesion detection sensor 18 and to reduce an error detected by the control unit 30 by providing the lamp panel 13 with anti-reflection coating in the snow adhesion preventing device 17.

First Modification Example of Second Embodiment

In the snow adhesion preventing device according to the second embodiment, another unit may be used as a unit for detecting snow adhesion. Hereinafter, the snow adhesion preventing device and the signaling apparatus according to the first modification example respectively have substantially the same configurations as the configurations of the snow adhesion preventing device 17 (FIG. 5) and the signaling apparatus 1 unless otherwise specified (FIG. 1).

Figure 9:
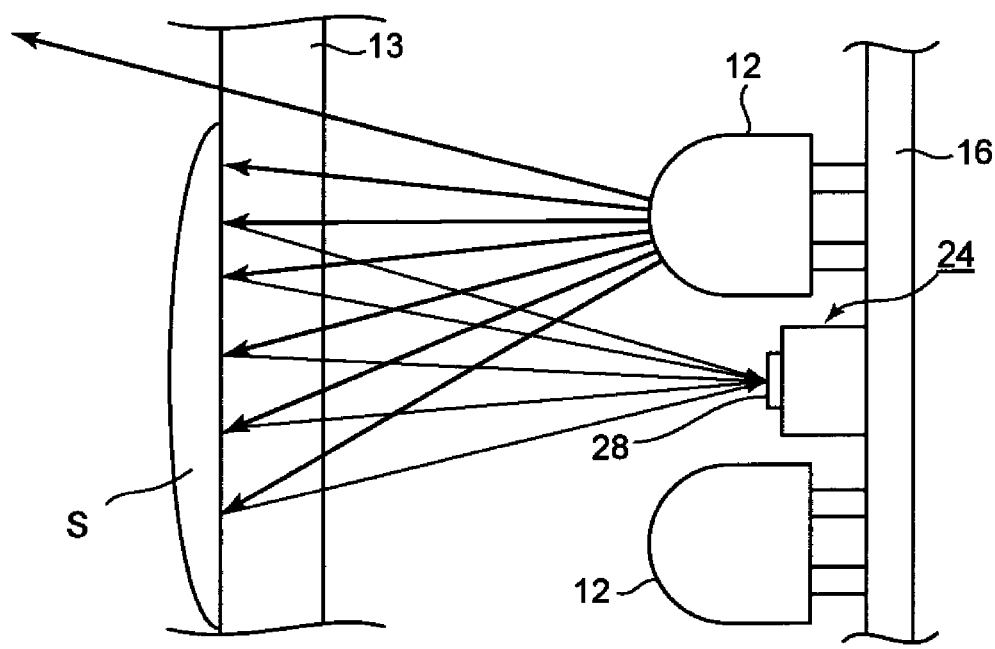
FIG. 9 is a view illustrating an example of an optical axis of transmitted and received light when there is snow adhesion by a sensor of a snow adhesion preventing device according to a first modification example of the second embodiment.

FIG. 9 is a view illustrating an example of an optical axis of transmitted and received light when there is snow adhesion by a snow adhesion detection sensor of the snow adhesion preventing device according to the first modification example of the second embodiment. The reference numerals described above indicate the same elements as those in FIGS. 1 to 6.

In the second example of the unit that detects snow adhesion, the snow adhesion preventing device 17 includes a plurality of snow adhesion detection sensors 24 (only one of which is illustrated in the drawing) which respectively detect snow adhesion to the lamp panel 13 on the rear side of the lamp panel 13. The snow adhesion detection sensor 24 is a light receiving sensor provided on an inside of the lamp panel 13 and receives the reflected light when light from the LED element 12 is reflected and returned to snow adhesion on the outside of the lamp panel 13, that is, on the panel front surface. The snow adhesion detection sensor 24 is a light receiving sensor mainly configured of a light receiving unit 28 (photodiode) and is mounted on the circuit board 16 between the LED elements 12.

In the snow adhesion preventing device (FIG. 9) according to the first modification example of the second embodiment having such a configuration, the LED element 12 plays the role of the light emitting unit, the light receiving unit plays the role of the snow adhesion detection sensor 24 (light receiving sensor), and snow adhesion is detected by the same method as that of one example (FIGS. 5 to 8). The control unit 30 stores the received light intensity at the normal time when there is no snow adhesion as the normal threshold value. Upon snowfall, the control unit 30 compares the received light intensity of the reflected light detected by the snow adhesion detection sensor 24 with the threshold value, determines that the received light intensity of the light reflected on the panel front surface and the panel rear surface of the lamp panel 13 is greater than received light intensity when there is no snow adhesion, and the control unit 30 can detect snow adhesion S (FIG. 9).

Second Modification Example of Second Embodiment

Furthermore, another unit may be used as the unit for detecting snow adhesion. Although the second embodiment and the first modification example described above, snow adhesion is detected by using the reflected light, a snow adhesion preventing device according to the second modification example detects snow adhesion with transmitted light.

Figure 10:
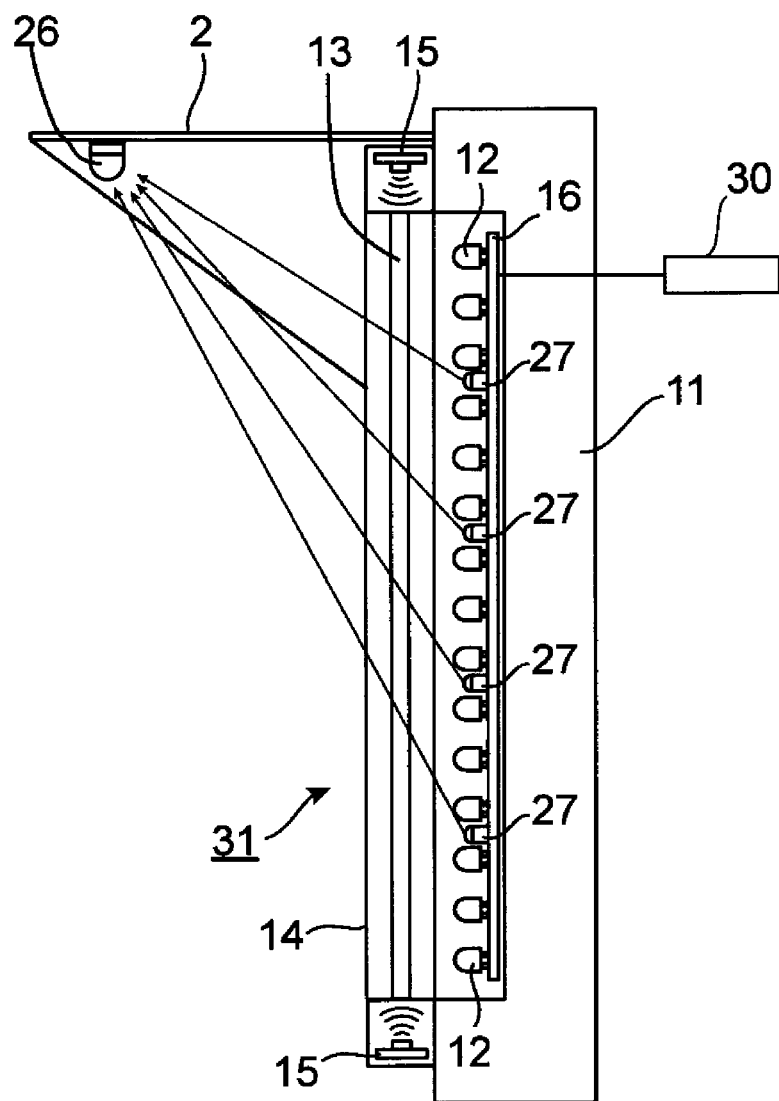
FIG. 10 is a view illustrating an example of an optical axis of transmitted and received light when there is no snow adhesion by a sensor of a snow adhesion preventing device according to a second modification example of the second embodiment.

FIG. 10 is a view illustrating an example of an optical axis of transmitted and received light when there is no snow adhesion by a snow adhesion detection sensor of a snow adhesion preventing device according to a second modification example of the second embodiment, and illustrates a longitudinal sectional structure of a snow adhesion preventing device 31. The reference numerals described above indicate the same elements as those in FIGS. 1 to 9.

In the third example of the unit that detects snow adhesion, the snow adhesion preventing device 31 includes a plurality of light emitting light source units 27 that is separated from LED elements 12 provided on an inside of a housing 11, and a light receiving unit 26 that is provided on an outside of a lamp panel 13. For example, laser diodes (LD) are used as the light emitting light source units 27. The light emitting light source units 27 are respectively mounted on a circuit board 16 between the LED elements 12 within a disk region on the circuit board 16 on a rear side of a lamp panel 13. The light receiving unit 26 is a photodiode provided on a front side of the lamp panel 13. The photodiode is provided on a lower surface side of an eave 2 in a state where a light receiving direction faces a lamp panel 13 side. An installation position of the photodiode can be variously changed.

Regarding other configurations, the snow adhesion preventing device 31 and the signaling apparatus of the modification example respectively have substantially the same configurations as those of the snow adhesion preventing device 17 (FIG. 5) and the signaling apparatus 1 (FIG. 1).

In the snow adhesion preventing device 31 (FIG. 10) having such a configuration, normally, when there is no snow adhesion, light of most light amount which is determined by a light transmittance, a temperature, and a light wavelength of a material of the lamp panel 13 in the light emitted from the light emitting light source unit 27 transmits the lamp panel 13. As illustrated in FIG. 10, when no foreign object such as snow adheres to the lamp panel 13, the control unit 30 determines that there is no change in the received light intensity of the light received by the light receiving unit 26.

Figure 11:
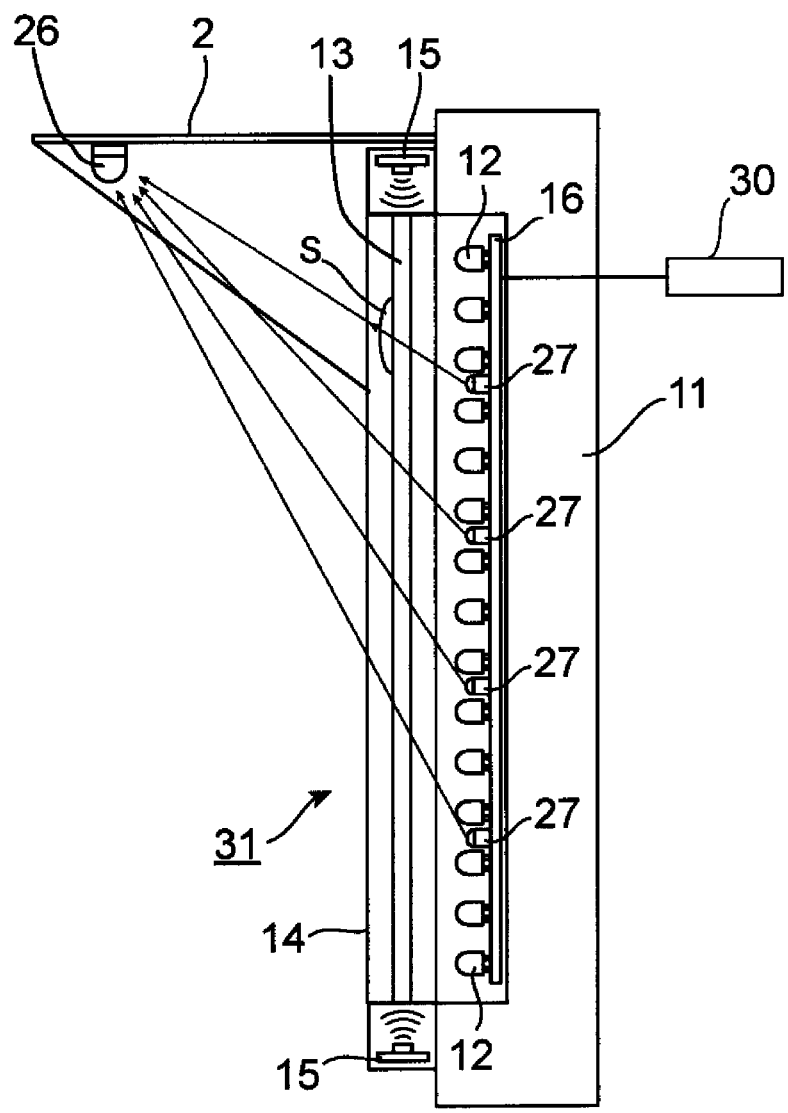
FIG. 11 is a view illustrating an example of an optical axis of transmitted and received light when there is snow adhesion by the sensor of the snow adhesion preventing device according to the second modification example of the second embodiment.

FIG. 11 is a view illustrating an example of an optical axis of transmitted and received light when there is snow adhesion S by the snow adhesion detection sensor of the snow adhesion preventing device according to the second modification example of the second embodiment. The reference numerals described above indicate the same elements as those in FIGS. 1 to 10. When snow falls and the foreign object such as snow adheres to the lamp panel 13, light of a light amount blocked by snow adhesion in the light emitted from the light emitting light source unit 27 reaches the light receiving unit 26. Light of which a transmitted light amount is reduced due to snow or the like reaches the light receiving unit 26. As illustrated in FIG. 11, when the foreign object such as snow S adheres to the lamp panel 13, the intensity of the light received by the light receiving unit 26 is decreased and the control unit 30 can detect that the foreign object adheres. The control unit 30 can detect snow adhesion S by the detection that the received light intensity of the light transmitted by the light receiving unit 26 is weaker than received light intensity (FIG. 10) of the transmitted light when there is no snow.

The control unit 30 may cause the light emitting light source unit 27 to emit light sequentially rather than simultaneously. For example, if the light emitting light source units 27 are arranged in a vertical raw, the control unit 30 causes the uppermost light emitting light source unit 27 to emit light and the remaining light emitting light source units 27 to remain turned off, and stores the received light intensity of the light receiving unit 26 when the uppermost light emitting light source unit 27 emits light. Subsequently, the control unit 30 stores the received light intensity of the light receiving unit 26 when only the light emitting light source unit 27 at a position lowered from the uppermost light emitting light source emits light and the light remaining emitting light source units 27 remain turned off. The control unit 30 compares the received light intensity that is firstly stored with the received light intensity that is secondly stored, and determines whether or not a degree of the change exceeds a predetermined threshold value. Similarly, the control unit 30 shifts the order of light emission of the light emitting light source units 27 one by one from top to bottom, and determines whether or not the degree of the change in the received light intensity of the light receiving unit 26 exceeds the threshold value in each order. As described above, the snow adhesion preventing device 31 can specify the place to which the foreign object adheres by shifting the order of light emission of the light emitting light source units 27 and comparing the received light intensities. Detection accuracy is improved by generating light having directivity to the light emitting light source unit 27. It is possible to emit light having directivity by using the laser diode and the snow adhesion preventing device according to the modification example can improve the detection accuracy of snow adhesion.

Third Embodiment

A snow adhesion preventing device according to the embodiment may be used for a road sign board, an electric light indicating board for guidance or advertisement. A snow adhesion preventing device 10 may be used for a guide device and a sign board on a road.

Figure 12A:
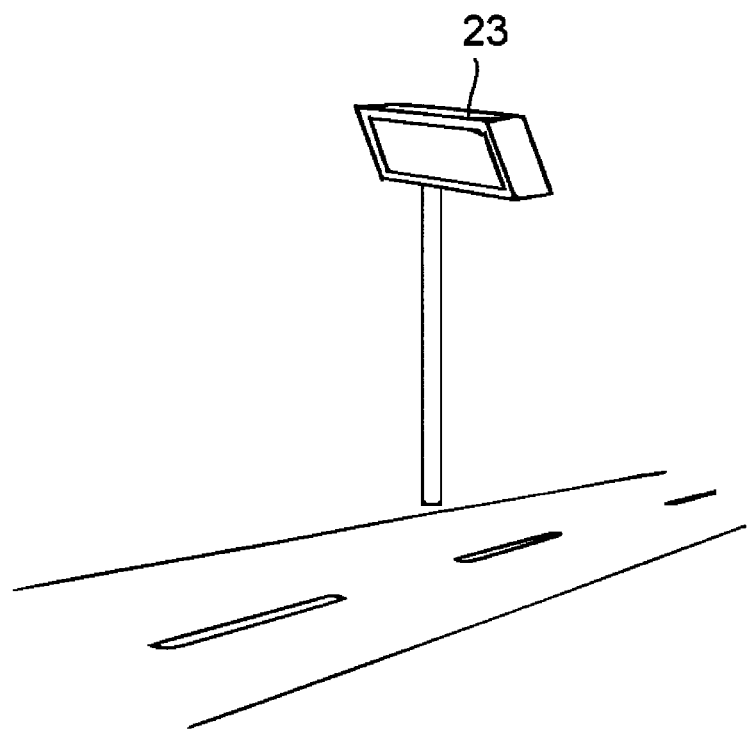
FIG. 12A is a perspective view of a guide device including a snow adhesion preventing device according to a third embodiment and FIG. 12B is a perspective view of a sign board including the snow adhesion preventing device according to the third embodiment.

FIG. 12A is a perspective view of the guide device including the snow adhesion preventing device according to a third embodiment. A guide device 23 is provided with any one of the snow adhesion preventing device 10, the snow adhesion preventing device 17, and the snow adhesion preventing device 31, and has the LED elements 12 in an information display light source. The lamp panel 13 functions as a display panel of the guide device 23.

Therefore, even in the weather in which snowstorm is generated from a lateral direction, snow adhesion on the display panel of the guide device 23 is dropped by vibration, and visibility of a driver of a vehicle traveling on the road is secured even when snow falls. Road guidance information such as statutory speed or road closure is announced to the driver.

Figure 12B:
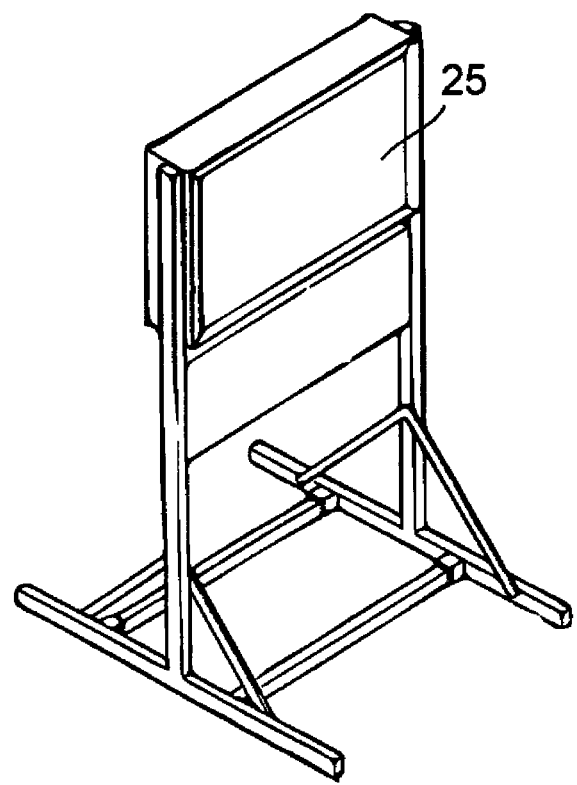

FIG. 12B is a perspective view of a sign board including the snow adhesion preventing device according to the third embodiment. A sign board 25 is a display device using the LED element 12 as a display light source and is provided with any one of the snow adhesion preventing device 10, the snow adhesion preventing device 17, and the snow adhesion preventing device 31. The sign board 25 also uses the lamp panel 13 as a display panel.

Therefore, even in snowstorm, the sign board 25 provided outside a store displays sales guidance of the store. Snow adhesion of the display panel on the sign board is removed by vibration and visibility is also secured even during snowfall. There is no need for a person to drop snow.

In each embodiment described above, the signaling apparatus 1 may be of a horizontal type in which the lamps 3 are arranged in a horizontal direction in addition to the vertical type in which the lamps 3 are arranged in the vertical direction, and the number of the lamps 3 may be two or four or more. The signaling apparatus 1 may be an arrow lamp in addition to the sign lamp, and may be provided in both the signaling apparatus and the arrow lamp.

As a name different from the snow adhering prevention, for example, the snow adhesion preventing device according to an embodiment such as icing prevention, snow covering, snow removing, and frost removal can be rephrased in various ways.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A snow adhesion preventing sign, comprising:
   a planar transparent panel that transmits outgoing light from LED elements in an information display arrangement on a rear surface to a front surface to which snow adheres;
   a frame provided on an outer periphery surface of the planar transparent panel, the outer periphery surface perpendicular to the rear surface and the front surface; and
   vibration generators provided in the frame and configured to vibrate the planar transparent panel.

2. The snow adhesion preventing sign according to claim 1,
   wherein the snow adhesion preventing sign is a road sign board for vehicles or an advertising sign board.

3. The snow adhesion preventing sign according to claim 1, further comprising:
   a sensor configured to detect snow adhesion to the planar transparent panel,
   wherein the vibration generator removes the snow adhesion with detection of the snow adhesion of the sensor.

4. The snow adhesion preventing sign according to claim 3,
   wherein the sensor comprises:
   a separate light source provided on a rear side of the planar transparent panel, and
   a light receiving unit provided on the rear side of the planar transparent panel to receive light reflected and returned by the snow adhesion on the front surface of the planar transparent panel from the separate light source.

5. The snow adhesion preventing sign according to claim 1, further comprising:
   a housing to which the planar transparent panel and the frame are fixed; and
   a temperature sensor provided within the housing,
   wherein the vibration generator operates when a temperature measured by the temperature sensor is a threshold temperature or lower.

6. The snow adhesion preventing sign according to claim 3,
   wherein the sensor is a reflection type sensor.

7. The snow adhesion preventing sign according to claim 3,
wherein the sensor is light receiving sensor.

8. The snow adhesion preventing sign according to claim 3,
comprising a plurality of sensors.

9. The snow adhesion preventing sign according to claim 1,
wherein the plurality of LED elements comprises a red LED element, a green LED element, and a yellow LED element.

10. The snow adhesion preventing sign according to claim 1,
wherein the plurality of LED elements comprises three different colored LED elements.

11. A snow adhesion preventing sign, comprising:
a planar transparent panel that transmits outgoing light from LED elements in an information display arrangement on a rear surface to a front surface to which snow adheres;
a frame provided on an outer periphery surface of the planar transparent panel, the outer periphery surface perpendicular to the rear surface and the front surface;
vibration generators provided in the frame and configured to vibrate the planar transparent panel; and
a sensor configured to detect snow adhesion to the planar transparent panel.

12. The snow adhesion preventing sign according to claim 11,
wherein the snow adhesion preventing sign is a road sign board for vehicles or an advertising sign board.

13. The snow adhesion preventing sign according to claim 11,
wherein the vibration generator removes the snow adhesion with detection of the snow adhesion of the sensor.

14. The snow adhesion preventing sign according to claim 11,
wherein the sensor comprises:
a separate light source provided on a rear side of the planar transparent panel, and
a light receiving unit provided on the rear side of the planar transparent panel to receive light reflected and returned by the snow adhesion on the front surface of the planar transparent panel from the separate light source.

15. The snow adhesion preventing sign according to claim 11, further comprising:
a housing to which the planar transparent panel and the frame are fixed; and
a temperature sensor provided within the housing,
wherein the vibration generator operates when a temperature measured by the temperature sensor is a threshold temperature or lower.

16. The snow adhesion preventing sign according to claim 11,
wherein the sensor is a reflection type sensor.

17. The snow adhesion preventing sign according to claim 11,
wherein the sensor is light receiving sensor.

18. The snow adhesion preventing sign according to claim 11,
comprising a plurality of sensors.

19. The snow adhesion preventing sign according to claim 11,
wherein the plurality of LED elements comprises a red LED element, a green LED element, and a yellow LED element.

20. The snow adhesion preventing sign according to claim 11,
wherein the plurality of LED elements comprises three different colored LED elements.

* * * * *